United States Patent [19]
Gibson et al.

[11] Patent Number: 5,936,243
[45] Date of Patent: Aug. 10, 1999

[54] CONDUCTIVE MICRO-PROBE AND MEMORY DEVICE

[75] Inventors: Gary Gibson, Palo Alto, Calif.; Takaaki Yagi, Kawasaki, Japan

[73] Assignee: Ian Hardcastle, Palo Alto, Calif.

[21] Appl. No.: 08/871,125

[22] Filed: Jun. 9, 1997

[51] Int. Cl.[6] .................................................... G01N 7/00
[52] U.S. Cl. .................... 250/306; 428/212; 428/469; 428/472; 428/408; 428/698; 428/699
[58] Field of Search .............................. 250/306; 428/408, 428/469, 472, 698, 699, 212

[56] References Cited

U.S. PATENT DOCUMENTS

| | | | |
|---|---|---|---|
| 4,943,720 | 7/1990 | Jones | 250/306 |
| 4,968,585 | 11/1990 | Albrecht et al. | 369/173 |
| 5,051,379 | 9/1991 | Bayer et al. | 250/306 |
| 5,116,462 | 5/1992 | Bartha et al. | 156/643 |
| 5,221,415 | 6/1993 | Albrecht et al. | 156/629 |
| 5,270,543 | 12/1993 | Visser et al. | 250/306 |
| 5,393,647 | 2/1995 | Neukermans et al. | 430/320 |
| 5,455,419 | 10/1995 | Bayer et al. | 250/306 |
| 5,475,318 | 12/1995 | Marcus et al. | 324/762 |

*Primary Examiner*—Archene Turner

[57] ABSTRACT

A micro-probe that has little deformation and wear while maintaining a desired conductivity is composed of a cylindrical wear resistant material and a conductive material. The wear resistant material provides mechanical contact with a contact target, while the conductive material provides an electrical contact with the contact target. The invention thus provides an ultra-small micro-probe having a long useful life, and that experiences little deformation or wear while maintaining the desired conductivity.

14 Claims, 3 Drawing Sheets

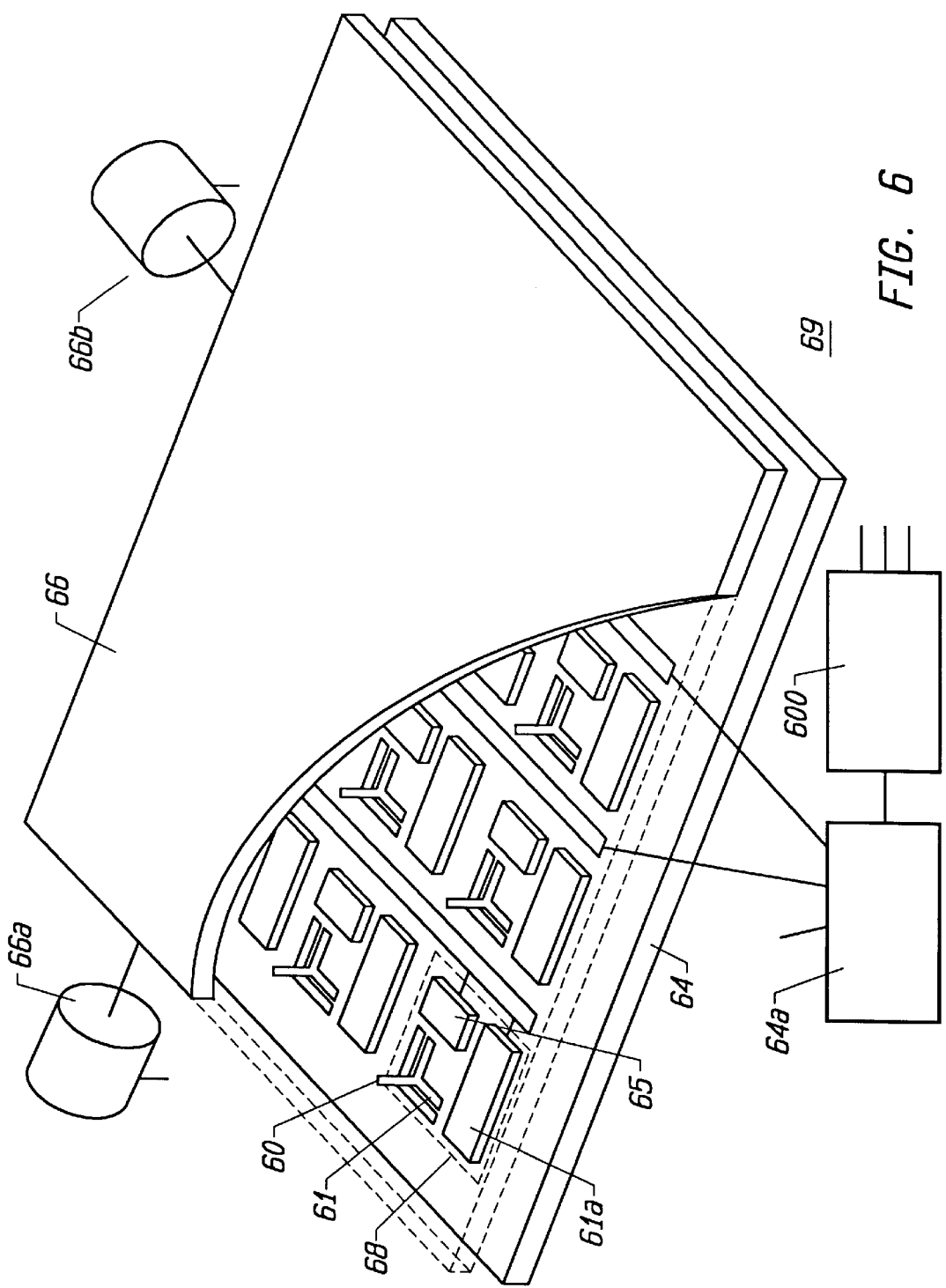

CONDUCTIVE MICRO-PROBE AND MEMORY DEVICE

BACKGROUND OF THE INVENTION

1. Technical Field

The invention relates to a micro-probe apparatus. In particular, the invention relates to an ultra-small, conductive micro-probe device that is suited for measuring, detecting, or transmitting electrical signals.

2. Description of the Prior Art

Conventional scanning probe microscopes (SPMs), for example scanning tunneling microscopes (STMs) and scanning atomic force microscopes (AFMs), have been primarily used to measure surface shapes. Recently, however, such devices have been widely used to measure various physical quantities of microscopic areas of an object. When measuring such physical quantities with a measurement device such as an SPM, particularly when measuring the electrical characteristics of a measurement target, an electrical connection is made between the measurement device and the measurement target using an extremely fine micro-probe apparatus.

A conventional conductive micro-probe device, for example as is typically used in an STM, includes a micro-probe formed as a thin film on the surface of a cantilever support member that is made from a simple metal element, such as Pt, Ir, or Au. The micro-probe comprises a fine rod formed on the cantilever support member and that is made of a single metal, such as tungsten (W). Such micro-probe includes a micro-probe tip that is formed or otherwise produced on the end of the micro-probe and that is tapered to a point, for example, by etching. The micro-probe tip is typically tapered such that it has a triangular pyramid shape or a quadrilateral pyramid shape. The micro-probe tip is typically made of such materials as silicon (Si) or silicon nitride ($Si_3N_4$), and may have a radius of curvature of about 50 nm.

Deformation or wear of a conventional micro-probe tip may occur as the micro-probe tip moves while in contact with the measurement target, for example, when the micro-probe device is used to measure the physical quantities of the target measurement surface. Such deformation or wear may result in various problems with the electrical and mechanical characteristics of the micro-probe device. Thus, a major factor in determining the useful life of equipment that is used to perform such measurements is the deterioration of the micro-probe tip contained therein.

The diameter of the area of contact between the measurement target and the micro-probe tip is measured in terms of nanometers. The useful life of the micro-probe tip is reduced because the volume of the micro-probe tip necessarily becomes smaller as the micro-probe tip wears during use, even though the amount of such wear is only microscopic.

The actual useful life of the micro-probe device is affected by such factors as the specified ranges of acceptable values that may be produced by the micro-probe device, e.g., the tolerance of the micro-probe tip, and the expected number of times that actions involving the micro-probe tip, such as contact operations, are possible while the micro-probe tip is otherwise within such specified ranges. It should be appreciated that the useful life of the micro-probe tip may be shortened by any one, or a combination of such factors.

For example, when a micro-probe device is used in the read head of an ultra-small, large capacity memory device, it is critical that a specific area of the micro-probe device be in contact with the measurement target, e.g., the storage medium. In such application, such critical factors as electric charge, resistance, current, and voltage must be precisely measured by the micro-probe device. Unfortunately, a conventional micro-probe device having, for example, a quadrilateral pyramid-shaped micro-probe tip is unacceptable for such application because the contact area between the micro-probe tip and the measurement target necessarily increases as the micro-probe tip becomes worn. As a result, the size of the area on the surface of the measurement target that stores a unit of data must be increased to accommodate the increase in contact area between the micro-probe tip and the surface of the measurement target resulting from such wear.

In an ultra-small, large capacity memory device, for example, as is disclosed by Saitoh et al. in Japanese unexamined patent no. 8-115600, the permitted contact area between the micro-probe tip and the surface of the measurement target is not readily altered to accommodate an increase in contact area due to wear of the micro-probe tip because the micro-probe tip is the end of a cylindrical micro-probe that has a uniform cross sectional area. The micro-probe used in Saitoh et al. is made from a single conductive material, such that wear of the micro-probe tip is a major problem.

Furthermore, if the micro-probe device deteriorates to the point that its useful life is at an end, then the useful life of the memory device itself is also at an end because the memory device is typically fabricated in such way that it is not convenient to replace a worn micro-probe device with a new micro-probe device. Thus, the useful life of the micro-probe device directly affects the useful life of the memory device. It would therefore be advantageous to provide a micro-probe device having a longer useful life.

SUMMARY OF THE INVENTION

The invention provides a cylindrical micro-probe that is fabricated from a composite material, rather than from a single conductive material. Additionally, the cross sectional area of the micro-probe is preferably selected to match the shape of the contact area between the probe tip and the surface of the measurement target. The composite material from which the micro-probe is formed contains at least one material that is difficult to deform during use and that therefore wears well. This material will be referred to as the wear resistant material. The composite material also contains at least one material having good conductivity. This material will be referred to as the conductive material. The micro-probe is thus fabricated from a material that comprises both a wear resistant material and a conductive material. The wear resistant material is arranged in the micro-probe so that such material is in mechanical contact with the surface of the measurement target. Similarly, the conductive material is arranged in the micro-probe so that such material is in electrical contact with the surface of the measurement target.

In the preferred embodiment of the invention, at least the portion of the micro-probe that comprises the micro-probe tip has a cross sectional area that matches the optimal shape of the area of contact between the micro-probe tip and the surface of the measurement target. Thus, the cross sectional area of the micro-probe tip preferably has a uniform cylindrical shape. This shape is referred to as the cylinder irrespective of whether it is solid or hollow. In applications that use the micro-probe in the read head of a memory device, the preferred micro-probe should have a substantially circular cross section.

By using both a material having little deformation or wear, and another material having excellent conductivity, a micro-probe is provided that exhibits both the desired conductivity and a minimal amount of deformation or wear during use. In addition, because wear of the micro-probe tip produces only a slight change in the contact area between the micro-probe tip and the surface of the measurement target, the electrical characteristics of the contact are stable over a long period of time. Therefore, the invention allows the fabrication of a memory device having a long useful life, an ultra-small size, and a large storage capacity.

BRIEF DESCRIPTION OF THE DRAWINGS

FIG. 6 is a cutaway perspective diagram that shows a memory apparatus that uses a micro-probe device according to the invention, where the recording medium of the memory device is scanned along two axes in the plane of the recording medium.

DETAILED DESCRIPTION OF THE INVENTION

Figure 1:
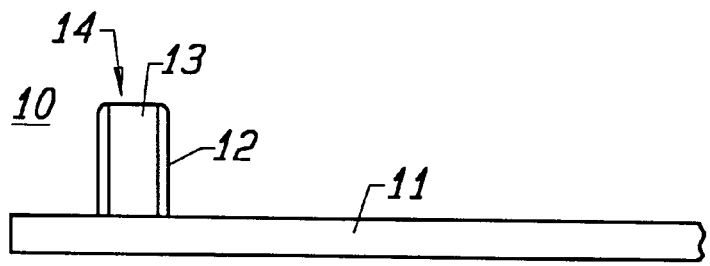
FIG. 1 is a diagram that shows a cross section of a micro-probe device according a first preferred embodiment of the invention.

FIG. 1 is a cross sectional diagram of a first preferred embodiment of micro-probe device 10 according to the invention. A micro-probe 14 is constructed such that it comprises a cylindrical core 13 that is formed of wear resistant material. The micro-probe 14 is situated on a lever 11, such as a cantilever. The core 13 of the micro-probe 14 is covered by a cladding 12 of conductive material. When the micro-probe 14 is in contact with a contact target during use, the conductive material that initially covers the tip after fabrication is worn off, resulting in the tip shown in the figure. Accordingly, when the micro-probe is in use, an end portion of each of the core 13 and the cladding 12 simultaneously touches a contact target.

The lever 11 is preferably fabricated from such materials as aluminum or silicon. Because electrical signals are conducted from the contact target by the lever 11 to be output from the memory device, impurities are preferably introduced into the crystal structure of silicon when it is used as the lever to establish an acceptable level of conductivity. To complete the output signal path from the micro-probe device, aluminum wires (not shown) are vapor deposited on the structure using well known deposition techniques, such as physical vapor deposition (PVD) or chemical vapor deposition (CVD).

The wear resistant material essentially provides mechanical contact with the contact target, while the conductive material primarily determines the electrical performance of the contact. During fabrication of the micro-probe device, a thin film of the wear resistant material is first deposited on the lever 11 using well known deposition techniques. A circular shape is patterned on the surface of the thin film that, after etching, forms the cylindrical core 13. The foregoing steps are performed using known micromachine fabrication techniques. Then, the conductive material is deposited on the core 13 to form the cladding 12 by such techniques as evaporation, activated reactive evaporation, sputtering, CVD, or MOCVD, for example.

The wear resistant material is preferably chosen from among such materials as diamond, $\Sigma$-$C_3N_4$, amorphous carbon, amorphous carbon nitride, diamond-like carbon, cubic boron nitride, $TiB_2$, $ZrB_2$, $B_4C$, $Si_3N_4$, AlN, $SiB_6$, $AlB_{12}$, $Al_2O_3$, $Cr_2O_3$, $TiO_2$, $SiO_2$, $HfO_2$, $Y_2O_3$, $ZrO_2$, or BeO. In the preferred embodiment of the invention, a diamond-like carbon (Vickers hardness: 5,000 to 10,000 kg/mm$^2$) is used. Of the above materials, diamond has the highest hardness (Vickers hardness: 8,000 to 10,000 kg/mm$^2$) and performs ideally as the wear resistant material.

The conductive material is preferably a metallic compound that is more difficult to deform and wear than simple metals. For example, the durability of the micro-probe may be improved by the use of such material as metallic carbides, nitrides, borides, or silicides. In the preferred embodiment of the invention, the conductive materials may be chosen from among such materials as metallic carbides, such as TiC, ZrC, HfC, VC, NbC, TaC, $Cr_3C_2$, $MO_2C$, and WC; metallic nitrides, such as TiN, ZrN, HfN, VN, NbN, TaN, CrN, and $MO_2N$; metallic borides, such as $TiB_2$, $ZrB_2$, $HfB_2$, $VB_2$, $NbB_2$, $TaB_2$, $CrB_2$, $MO_2B_5$, and $W_2B_5$; or metallic silicides, such as $TiSi_2$, $ZrSi_2$, $HfSi_2$, $VSi_2$, $NbSi_2$, $TaSi_2$, $Cr_3Si_2$, $MoSi_2$, and $WSi_2$.

In an exemplary and presently preferred embodiment of the invention, the conductive material comprises TiC or TiN, although TiN is presently preferred because of its superior workability and lower cost. When compared to simple metals, tungsten (W) has a relatively high Vickers hardness (around 130 kg/mm$^2$). TiN is about fifteen times harder than tungsten (1,700 to 2,100 kg/mm$^2$). TiN has a resistivity of about 200 n$\Omega$m, which is about four times that of tungsten. Although this resistivity is higher than that of simple metals, such resistivity is sufficiently low and does not substantially interfere with the performance of the micro-probe device when used in the read head of a memory device.

Figure 2:
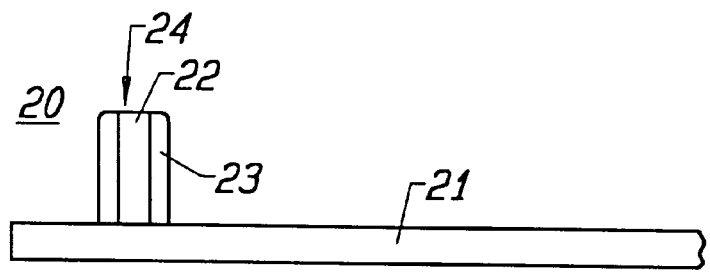
FIG. 2 is a diagram that shows a cross section of a micro-probe device according to a second, equally preferred, embodiment of the invention.

FIG. 2 is a cross sectional diagram of a second, equally preferred embodiment of the micro-probe device 20 according to the invention. A micro-probe 24 shown on FIG. 2 is constructed such that the cylindrical core 22 of conductive material is formed on a lever 21. The lever 21 is preferably a cantilever similar to the lever 11 shown on FIG. 1 that supports the micro-probe 24. The core is covered by the cladding 23, a layer of a wear resistant material.

During fabrication of the cylindrical core 22, a thin film of conductive material is first deposited on the lever 21 using any well known technique (such as those techniques described above in connection with FIG. 1). A circular shape is then patterned on the thin film surface, and the surface is then etched to form the core. The wear resistant material is then deposited on the core using such techniques as sputtering or CVD. Material thus deposited at the tip of the micro-probe 24 is removed by anisotropic etching. Thereafter, the tip of the micro-probe 24 is capable of functioning electrically.

Figure 3:
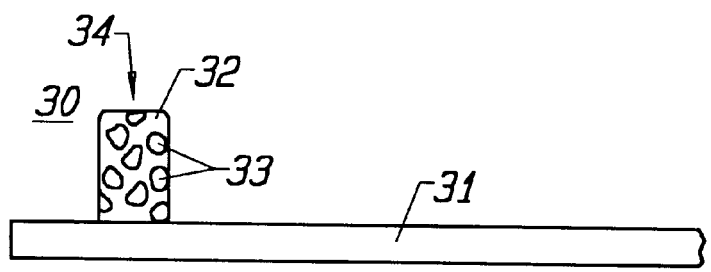
FIG. 3 is a diagram that shows a cross section of a micro-probe device according to a third, equally preferred, embodiment of the invention.

FIG. 3 is a cross sectional diagram of a third, equally preferred embodiment of a micro-probe device 30 according to the invention. A micro-probe 34 is formed into a roughly cylindrical shape on a lever 31 which is similar to that of the lever 11 shown on FIG. 1. The micro-probe is formed from a composite material that is a mixture of a conductive material and a wear resistant material. The two materials that comprise the micro-probe 34 are deposited in such manner that a compound material is not formed.

Rather, it is preferred to form a thin film that mixes small crystalline particles of the two materials. This is implemented by depositing the conductive material and the wear resistant material by sputtering each of the materials from a separate evaporation source. In such structure, the high wear resistance that is fundamental to a wear resistant material is provided because the mixed particles can be deposited as monocrystals by appropriately selecting the size and crystal characteristics of the particles that are mixed. As shown on FIG. 3, the crystals 33 of wear resistant material are dispersed in the crystals 32 of the conductive material. For example, the structure of the device is comprised of SiN dispersed in TiN. In FIG. 3, the sizes of the crystals 33 are somewhat exaggerated for convenience in the explanation.

Figure 4:
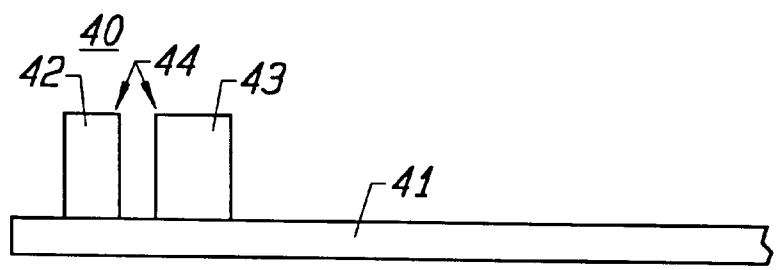
FIG. 4 is a diagram that shows a cross section of a micro probe device according to a fourth, equally preferred, embodiment of the invention.

FIG. 4 is a cross sectional diagram of the micro-probe device 40 of the fourth embodiment. A micro-probe 44 consists of a cylinder 42 of conductive material and a cylinder 43 of wear resistant material that are separately formed and placed next each other on a lever 41 that is similar to lever 11. In this way, the load associated with contacting the micro-probe to the contact target is supported by the cylinder 43, while electrical conductivity is the responsibility of the cylinder 42. Thus, mechanical durability of the micro-probe is improved.

During fabrication of this embodiment of the invention, the cylinder 43 is formed on the lever 41 and the thin film of conductive material is deposited on the cylinder. Next, the cylinder 42 is formed by etching. The positional relationships of the cylinder 43 and the cylinder 42 with respect to the lever 41 can be exchanged. Although the gap between the two cylinders may be large, such gap should be less than the sum of the radii of the cylinder 42 and the cylinder 43.

In connection with the first to fourth embodiments of the invention, as described above, the composite material micro-probe is preferably formed by combining a conductive material and a wear resistant material, where the wear resistant material preferably has a cross sectional area with a diameter of several dozen nanometers and a length of several hundred nanometers.

Figure 5:
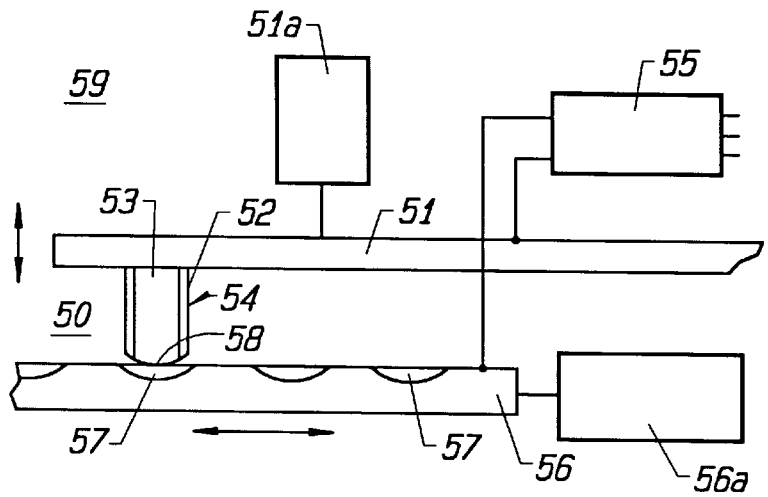
FIG. 5 is a diagram that shows the structure of a composite material micro-probe device while transmitting and receiving data between the micro-probe device and the recording medium of a memory device according to the invention.

FIG. 5 is a diagram that shows the structure of a composite material micro-probe device 50 while transmitting and receiving data between the micro-probe 54 and the recording medium of a memory device according to the invention. The tip of the micro-probe in this embodiment is a curved surface having a radius of curvature 58 of several dozen nanometers. The memory device of the invention is not limited to these values, but these values are thought to be particularly well suited to the micro-probe 24 and the micro-probe 34.

In the case of the embodiment of the invention shown in FIG. 4, although not required, the area of the cylinder that is formed of conductive material and that occupies the tip of the micro-probe, should have a lateral cross sectional area that is smaller than the area of the cylinder that is formed of wear resistant material. This arrangement provides a higher resolution conductive tip and, at the same time, provides a broader and, therefore, slower wearing wear resistant cylinder.

In FIG. 5, the recording medium 56 of the memory device 59 is the contact target of the micro-probe 54. The data in the data area 57 is detected as a current that flows, or as a voltage that develops, in the micro-probe 54. The micro-probe 54 is supported by the lever 51. As the lever 51 is driven by either an electrostatic force, an electrical stress, or a magnetic stress from the drive unit 51a, the micro-probe 54 moves almost vertical to the surface of the recording medium 56. In this way, the recording medium 56 and the micro-probe 54 are either electrically connected or isolated. The micro-probe device 50 is used as the read/write head of the memory device 59. The recording medium 56 is moved in the direction of the surface by the drive equipment 56a. During operation, the micro-probe 54 can access different data areas 57 of the recording medium 56.

The signals derived from the recording medium 56 are received by a signal processor 55 that is connected to the recording medium 56 and to the lever 51. The signal processor 55 is configured to communicate these signals for use outside of the memory device, e.g., within a computer.

A cylindrical micro-probe having the structure shown in FIG. 1 is depicted in FIG. 5, although the micro-probe 54 is not restricted to the structure shown on the figure. The structure shown has cylindrical cladding 52 of conductive material. The conductive cladding 52 covers the cylindrical core 53 of wear resistant material. The cylindrical core and cylindrical cladding are formed on the lever 51. A current, e.g, the conducting current, the surface current, or the tunnel current, flows between the recording medium 56 and the micro-probe device.

FIG. 6 is a partial cutaway perspective drawing of a memory device 69 that scans the plane of a recording medium 66 along two axes. Such scanning is performed by the drive units 66a, 66b. Information is written to or read from the recording medium 66 by multiple micro-probes 60 that are in physical and electrical contact with the recording medium 66. The micro-probe 60 is formed on a lever 61.

Read and write signals pass through the lever 61 and are processed by an electrical circuit 65 located on the substrate 64. If the lever 61 is not itself conductive, then suitable conductive wires may be deposited on the lever using known techniques. The data read and write signals are transmitted between the recording medium 66 and the electrical circuit 65. A probe area 68 is formed by adding an electrical circuit for each micro-probe 60. A drive circuit 61a controls the movement of the lever 61. Finally, the signals from each electrical circuit 65 are transmitted to an external unit 64a. The overall operation of the memory device 69 is controlled by a control circuit 600.

Figure 7:
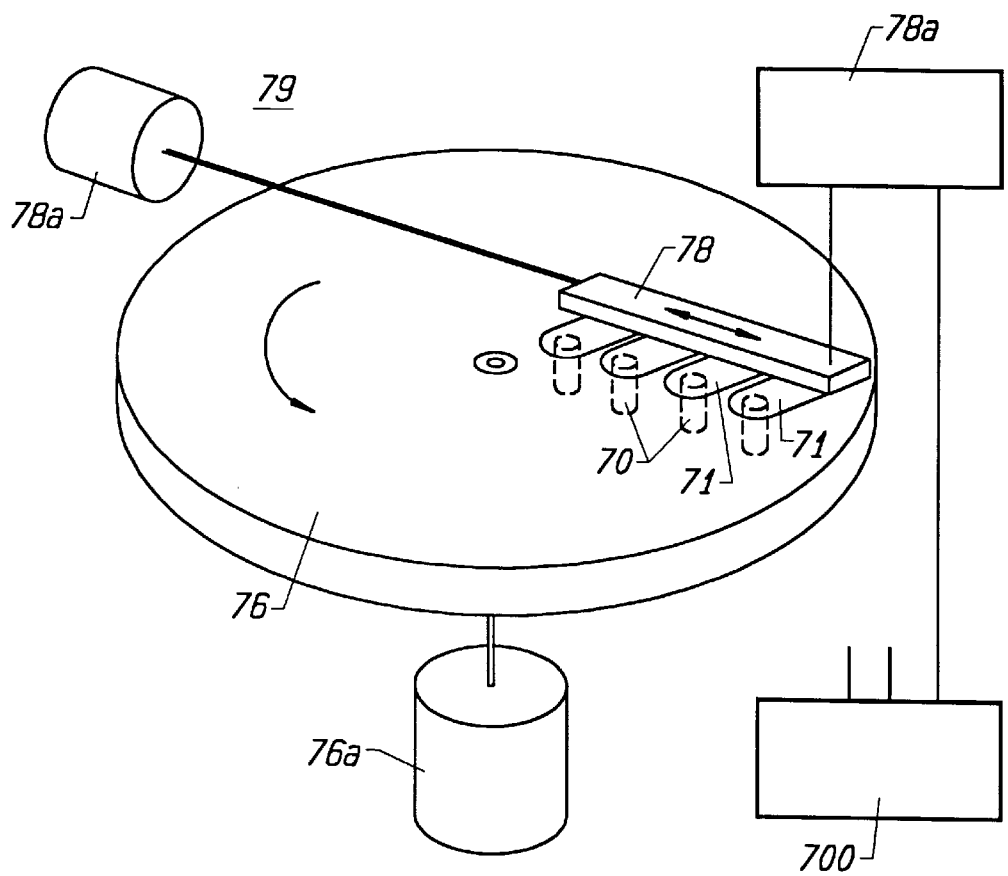
FIG. 7 is a partial perspective diagram that shows a memory apparatus that uses a micro-probe device according to the invention, in which the recording medium is rotated.

As shown on FIG. 7, the composite material micro-probe herein disclosed is readily used in a memory device 79 that has a circular recording medium 76 that is rotated by the drive unit 76a. The memory device includes an array of micro-probes 70 that contact the recording medium. The micro-probes have a scanning axis in the radial direction for reading and writing. All of the micro-probes 70 are attached to an arm 78 by the levers 71. The arm 78 scans along one axis by the drive unit 76b in the radial direction of the recording medium 76. Signals exchanged between the recording medium 76 and a signal processor 78a are transmitted via the micro-probe 70, the lever 71, and the arm 78. A signal processor 78a processes the signals. The overall operation of the memory device 79 is controlled by a control circuit 700.

In each of above embodiments, contact between the composite material micro-probe and the recording medium or another target can be continuous or intermittent. The invention function satisfactorily in both cases. In addition, the electrical contact may be established without requiring a mechanical contact, e.g., where such electrical contact is established by a tunneling current.

The micro-probe can have a cylindrical shape, preferably with a uniform cross section near the tip and with any desired shape near the lever. The degree of uniformity of the cross section maintains consistent conductivity without exceeding a specific design tolerance range, even when the shape of the contact surface is changed by wear. The micro-probe does not have to be formed as a vertical cylinder. Thus, it may be mounted at an oblique angle to the lever. However, the position control must be more precise in such case because the cross section develops a positional offset as the micro-probe wears, even when the cross section is uniform.

Various shapes can be selected for the cross sectional shape. The shape can be an elliptical shape, a rectangular shape, or another shape that matches the contact target. The target cylinder to be covered with conductive material in the embodiments shown on FIGS. 1 and 2 does not have to be entirely covered by such material. Further, the cylinder may be formed such that it has slits along its axis. The cylinder may also be formed as a hollow cylinder or as a solid rod, which in either case is referred to herein as a cylinder.

In addition, a buffer layer can be placed between the micro-probe and the lever to simplify the production of the micro-probe. Alternatively, the micro-probe and the lever can be separately produced beforehand, and then combined and assembled to form a unit.

Although the invention is described herein with reference to the preferred embodiment, one skilled in the art will readily appreciate that other applications may be substituted for those set forth herein without departing from the scope of the invention. For example, the composite material micro-probe implemented by the invention can be used as a highly durable micro-probe that selects a test signal for an electrical circuit that includes components having a width of less than a micron. Also, the composite material micro-probe can be used as a micro-probe in nanofabrication. Thus, the micro-probe can also be used to electrically process a surface and in chemical modifications. A wide range of applications, such as device process masks or micro machine fabrication, are also possible with the herein disclosed device. Accordingly, the invention should only be limited by the claims included below.

I claim:

1. A micro-probe device, comprising:
    a lever;
    a wear resistant material supported on said lever, said wear-resistant material having at least mechanical contact with a contact target; and
    a conductive material supported on said lever, said conductive material having at least electrical contact with said contact target;
    wherein said wear resistant material is dispersed in said conductive material.

2. The micro-probe device of claim 1, said wear resistant material dispersed in said conductive material comprising:
    a cylinder.

3. The micro-probe device of claim 1, said conductive material comprising:
    a metallic compound.

4. The-micro probe device of claim 3, said metallic compound comprising either a metallic carbide, nitride, boride, or silicide.

5. The micro-probe device of claim 4, said metallic compound being chosen from among any of metallic carbides, including TiC, ZrC, HfC, VC, NbC, TaC, $Cr_3C_2$, $Mo_2C$, and WC; metallic nitrides, including TiN, ZrN, HfN, VN, NbN, TaN, CrN, and $Mo_2N$; metallic borides, including $TiB_2$, $ZrB_2$, $HfB_2$, $VB_2$, $NbB_2$, $TaB_2$, $CrB_2$, $Mo_2B_5$, and $W_2B_5$; or metallic silicides, including $TiSi_2$, $ZrSi_2$, $HfSi_2$, $VSi_2$, $NbSi_2$, $TaSi_2$, $Cr_3Si_2$, $MoSi_2$, and $WSi_2$.

6. The micro-probe device of claim 1, said wear resistant material comprising:
    a diamond-like carbon material.

7. The micro-probe device of claim 1, said wear resistant material being chosen from among any of diamond, Σ-C3N4, amorphous carbon, amorphous carbon nitride, diamond-like carbon, cubic boron nitride, TiB2, ZrB2, B4C, Si3N4, AlN, SiB6, AlB12, Al2O3, Cr2O3, TiO2, SiO2, HfO2, Y2O3, ZrO2, or BeO.

8. A micro-probe device, comprising:
    a lever;
    a wear resistant material supported on said lever, said wear-resistant material having at least mechanical contact with a contact target; and
    a conductive material supported on said lever, said conductive material having at least electrical contact with said contact target;
    wherein said wear resistant material and said conductive material are positioned next to each other on said lever.

9. The micro-probe device of claim 8, said conductive material comprising a cylinder having a cross sectional area that is smaller area than a cross sectional area occupied by a cylinder formed of said wear resistant material.

10. The micro-probe device of claim 8, said conductive material comprising:
    a metallic compound.

11. The-micro probe device of claim 10, said metallic compound comprising either a metallic carbide, nitride, boride, or silicide.

12. The micro-probe device of claim 11, said metallic compound being chosen from among any of metallic carbides, including TiC, ZrC, HfC, VC, NbC, TaC, Cr3C2, Mo2C, and WC; metallic nitrides, including TiN, ZrN, HfN, VN, NbN, TaN, CrN, and Mo2N; metallic borides, including TiB2, ZrB2, HfB2, VB2, NbB2, TaB2, CrB2, Mo2B5, and W2B5; or metallic silicides, including TiSi2, ZrSi2, HfSi2, VSi2, NbSi2, TaSi2, Cr3Si2, MoSi2, and WSi2.

13. The micro-probe device of claim 8, said wear resistant material comprising:
    a diamond-like carbon material.

14. The micro-probe device of claim 8, said wear resistant material being chosen from among any of diamond, Σ-C3N4, amorphous carbon, amorphous carbon nitride, diamond-like carbon, cubic boron nitride, TiB2, ZrB2, B4C, Si3N4, AlN, SiB6, AlB12, Al2O3, Cr2O3, TiO2, SiO2, HfO2, Y2O3, ZrO2, or BeO.

* * * * *